(12) United States Patent
Ebihara et al.

(10) Patent No.: US 7,586,545 B2
(45) Date of Patent: Sep. 8, 2009

(54) APPARATUS AND METHODS FOR CONTROLLING AN ON-SCREEN DISPLAY

(75) Inventors: Tatsuya Ebihara, Yokohama (JP); Masataka Otsuka, Mito (JP)

(73) Assignee: Hitachi, Ltd., Tokyo (JP)

( * ) Notice: Subject to any disclaimer, the term of this patent is extended or adjusted under 35 U.S.C. 154(b) by 830 days.

(21) Appl. No.: 11/185,694

(22) Filed: Jul. 21, 2005

(65) Prior Publication Data

US 2006/0017851 A1 Jan. 26, 2006

(30) Foreign Application Priority Data

Jul. 21, 2004 (JP) ............................. 2004-212635

(51) Int. Cl.
*H04N 5/445* (2006.01)
(52) U.S. Cl. .................. 348/569; 348/563; 348/465; 348/468; 345/629; 715/716
(58) Field of Classification Search ................ 348/569, 348/563, 564, 465, 468; 345/629, 636; 715/716, 715/762, 805
See application file for complete search history.

(56) References Cited

U.S. PATENT DOCUMENTS 5,386,247 A * 1/1995 Shafer et al. ................ 348/687

6,369,858 B1 * 4/2002 Lee ............................ 348/569
6,678,009 B2 * 1/2004 Kahn ......................... 348/569
7,212,250 B1 * 5/2007 Neal .......................... 348/569

FOREIGN PATENT DOCUMENTS

JP         07-123306         5/1995

* cited by examiner

*Primary Examiner*—David L Ometz
*Assistant Examiner*—Jean W Désir
(74) *Attorney, Agent, or Firm*—Antonelli, Terry, Stout & Kraus, LLP.

(57) ABSTRACT

The present invention provides an OSD display apparatus that prevents even a local OSD display from being blended with a surrounding background image. To implement this, the OSD display apparatus that superimposes an image or a character on a display image as an OSD display comprises an OSD generation circuit 11 for generating an OSD signal that is information on the OSD display, an extraction circuit 12 for extracting information on the hue of an OSD surrounding area on the display image, a hue comparison circuit 13 for comparing the information extracted by the extraction circuit 12 with the hue of the OSD signal generated by the OSD generation circuit 11, and a hue control circuit 14 for controlling the hue of the OSD signal based on the comparison result of the hue comparison circuit 13.

19 Claims, 10 Drawing Sheets

FIG. 3
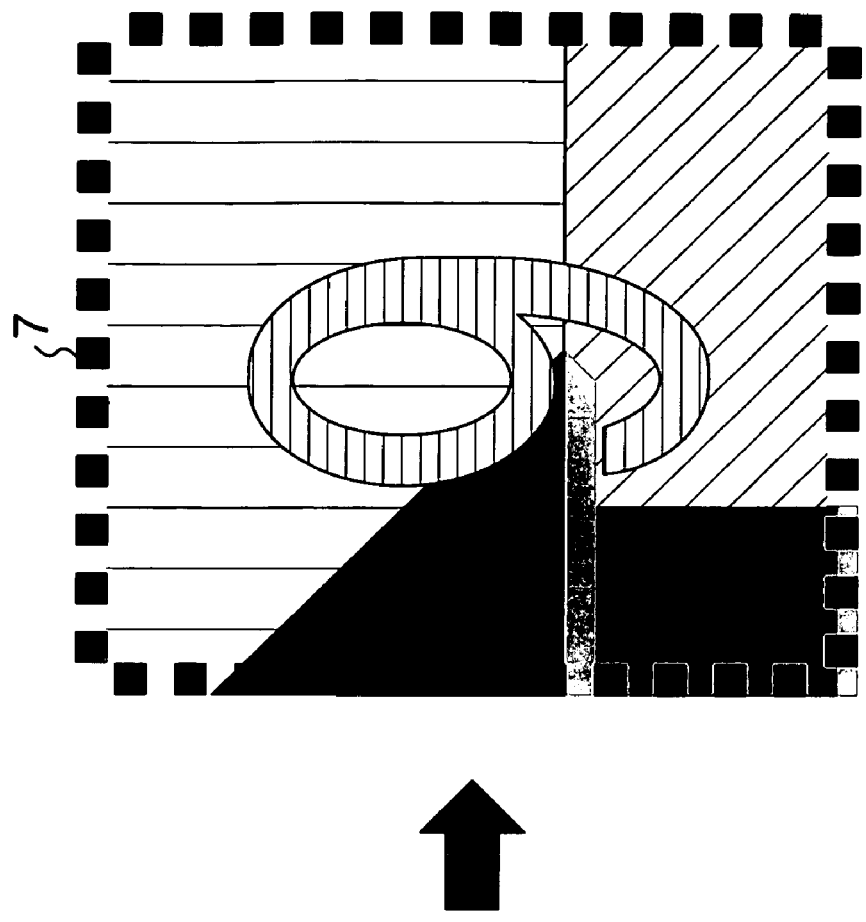
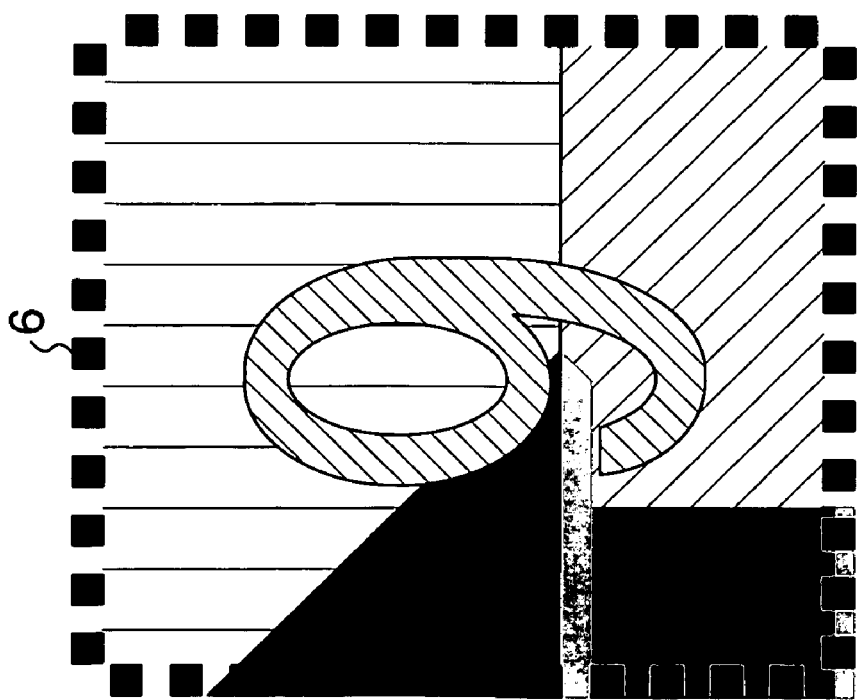

APPARATUS AND METHODS FOR CONTROLLING AN ON-SCREEN DISPLAY

INCORPORATION BY REFERENCE

The present application claims priority from Japanese application JP 2004-212635 filed on Jul. 21, 2004, the content of which is hereby incorporated by reference into this application.

BACKGROUND OF THE INVENTION

The present invention relates to an On-Screen Display (OSD) apparatus that superimposes a character or an image on a display image on an image display apparatus such as a color television set and a color display device, and more particularly to a technology advantageously applicable to the hue control of an OSD display against a background image.

Conventionally, several OSD technologies for superimposing a character or an image on the display image of a television set have been devised. For example, an image data OSD circuit was introduced that detects the hue of a display image and contrasts a superimposing OSD image with the hue of a display image to prevent the OSD image from being blended with the background display image for clearly displaying the OSD image (for example, JP-B-7-123306).

SUMMARY OF THE INVENTION

The problem with the image data OSD circuit disclosed in JP-B-7-123306 is that, because the hue is detected from the video signal of the whole screen of a display image, the detected hue is the average hue of the whole screen. For example, when a character or an image is superimposed (OSD display) locally on a part of the screen, the hue of the OSD surrounding area is not always equal to the average hue of the whole screen. As a result, especially when the hue of an OSD display is similar to that of the background display image, the OSD is sometimes blended with the background.

In view of the foregoing, it is an object of the present invention to solve the above problem and to provide an OSD display apparatus that prevents an OSD display from being blended with the background image even when it is displayed locally.

The following describes the overview of the representative inventions disclosed in this application.

An OSD display apparatus according to the present invention is an OSD display apparatus that superimposes an image or a character on a display image as an OSD display. The display apparatus comprises an OSD generation circuit for generating an OSD signal that is information on the OSD display, an extraction circuit for extracting information on the hue of an OSD surrounding area on the display image, a hue comparison circuit for comparing the information extracted by the extraction circuit with the hue of the OSD signal generated by the OSD generation circuit, and a hue control circuit for controlling the hue of the OSD signal based on the comparison result of the hue comparison circuit.

Another OSD display apparatus according to the present invention is an OSD display apparatus that superimposes an image or a character on a display image as an OSD display. The display apparatus comprises an OSD generation circuit for generating an OSD signal that is information on the OSD display, an extraction circuit for extracting information on the hue and the brightness of an OSD surrounding area on the display image, a hue/brightness comparison circuit for comparing the information extracted by the extraction circuit with the hue and the brightness of the OSD signal generated by the OSD generation circuit, and a hue/brightness control circuit for controlling the hue and the brightness of the OSD signal based on the comparison result of the hue/brightness comparison circuit.

A still another OSD display apparatus according to the present invention is an OSD display apparatus that superimposes an image or a character on a display image as an OSD display. The display apparatus comprises an OSD generation circuit for generating an OSD signal that is information on the OSD display, an extraction circuit for extracting information on the hue of an OSD surrounding area on the display image, and a hue detection circuit for detecting the hue of the information extracted by the extraction circuit, wherein the OSD generation circuit controls the hue of the OSD signal, which is generated by the OSD generation circuit, based on the information on the hue detected by the hue detection circuit.

The following briefly describes the effect achieved by the representative inventions disclosed by this application.

The display apparatus according to the present invention extracts the display image of the OSD surrounding area and automatically controls the hue of the generated OSD signal according to the hue of the display image of the extracted OSD surrounding area, thus providing a clear, easy-to-view OSD display that is not blended with the background of the OSD display part for any display image.

In addition, not only the hue but also the brightness is controlled. For example, when the display image is a bright image, the brightness of the OSD is increased to brighten the OSD; conversely, when the display image is dark, the brightness of the OSD is decreased to darken the OSD. This allows the apparent contrast to be maintained at a fixed level, thus providing a quiet but easy-to-view OSD display.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing a close-up of an OSD surrounding area on the display screen of the OSD display apparatus in the first embodiment of the present invention.

DESCRIPTION OF THE EMBODIMENTS

Figure 1:
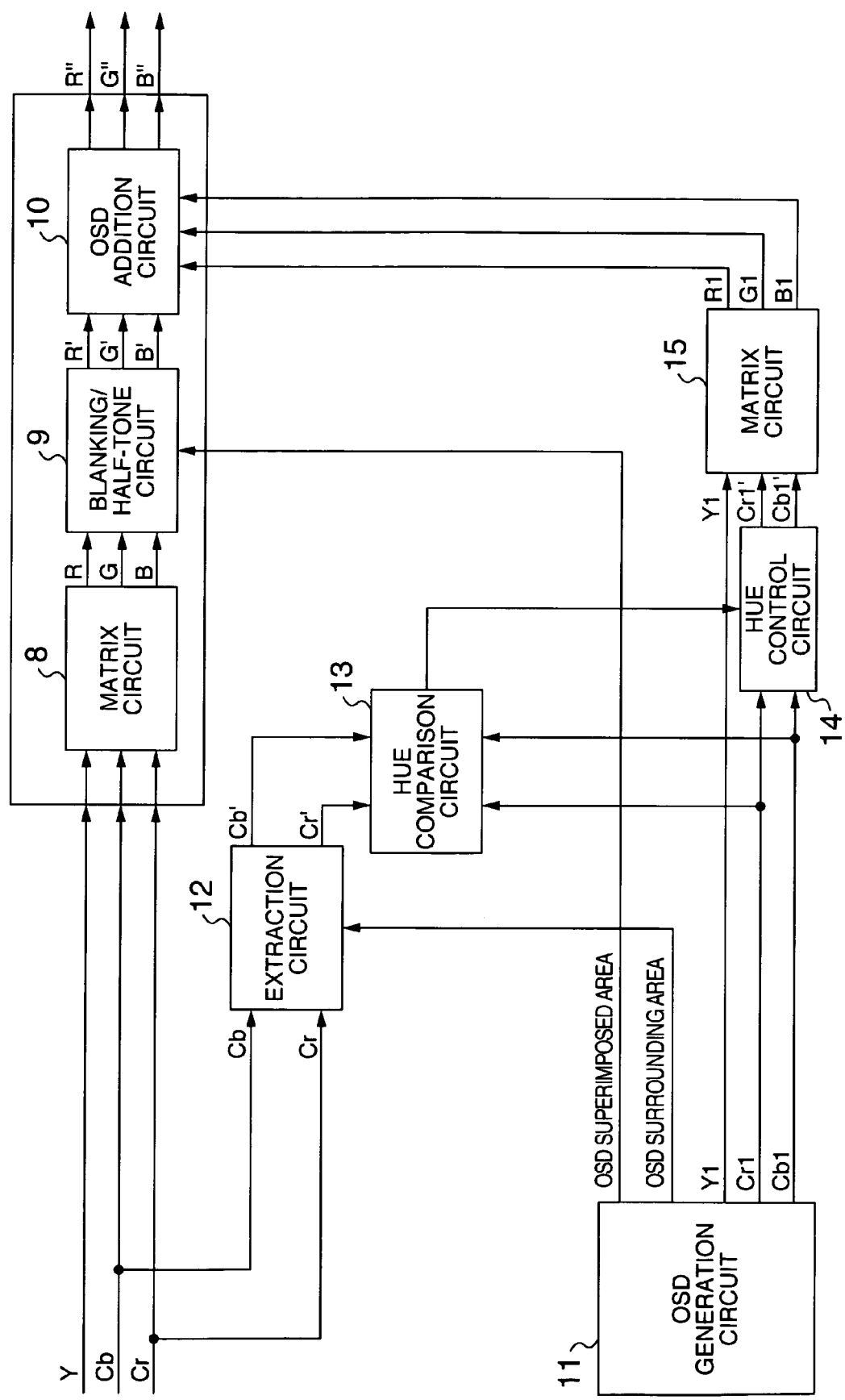
FIG. 1 is a diagram showing the configuration of an OSD display apparatus in a first embodiment of the present invention.

Embodiments of the present invention will be described in detail below with reference to the drawings. In all of the drawings for explaining the embodiments, the same reference numeral is basically given to components having the same function and repetitive description will not be given.

<Configuration of OSD Display Apparatus>

With reference to FIG. 1, the configuration of an OSD display apparatus in a first embodiment of the present invention will be described. FIG. 1 is a diagram showing the configuration of the OSD display apparatus in the first embodiment of the present invention.

Referring to FIG. 1, the OSD display apparatus comprises a matrix circuit 8, a blanking/half-tone circuit 9, an OSD addition circuit 10, an OSD generation circuit 11, an extraction circuit 12, a hue comparison circuit 13, a hue control circuit 14, and a matrix circuit 15.

The matrix circuit 8 receives the brightness signal (Y) and the color difference signals (Cb, Cr) of a display image and outputs primary color signals (R, G, B) based on the brightness signal (Y) and the color difference signals (Cb, Cr) of the display image.

The OSD generation circuit 11 generates an OSD signal, which is OSD display information to be added to a display image, and outputs it as the brightness signal (Y1) and the color difference signals (Cb1, Cr1) of the OSD signal. The OSD generation circuit 11 also outputs an OSD superimposed area signal, which indicates a part corresponding to the superimposed part of the generated OSD signal, and an OSD surrounding area signal which indicates a part corresponding to the surrounding area of the generated OSD signal using, for example, an extraction signal for extracting the surrounding area. The OSD superimposed area signal corresponding to the OSD background part is used to mask a part, which is hidden by the OSD display, from the original display image.

The extraction circuit 12 receives the color difference signals (Cb, Cr) of the display image, extracts the OSD surrounding area of the OSD display on the display image based on the OSD surrounding area signal from the OSD generation circuit 11, and outputs the color difference signals (Cb', Cr') of only the image in the extracted surrounding area of the OSD display. The image is extracted, for example, by passing the signals only when the extraction signal, which is the OSD surrounding area signal, is high.

The hue comparison circuit 13 receives the color difference signals (Cb', Cr') from the extraction circuit 12 and the color difference signals (Cb1, Cr1) from the OSD generation circuit 11 and outputs information corresponding to the difference between the color difference signals (Cb', Cr') and the color difference signals (Cb1, Cr1). The signals corresponding to this difference are output as the difference between the average of the color difference signals (Cb', Cr') of the image of the OSD surrounding area extracted by the extraction circuit 12 and the color difference signals (Cb1, Cr1) of the OSD display image output from the OSD generation circuit 11.

The hue control circuit 14 receives the color difference signals (Cb1, Cr1) of the OSD signal from the OSD generation circuit 11, changes the hue of the received OSD signal according to the information corresponding to the difference output by the hue comparison circuit 13, and outputs color difference signals (Cb1', Cr1') whose hue has been changed.

For example, setting the hue control amount of the hue control circuit 14 in inverse proportion to the value of information output from the hue comparison circuit 13 causes the hue control circuit 14 to increase the hue control amount when the output of the hue comparison circuit 13 is small (that is, the hue of the OSD surrounding area in the display image is rather close to the hue of the OSD signal). This configuration makes the hue of the OSD signal output from the hue control circuit 14 different largely from the hue of the OSD surrounding part in the display image and displays the OSD display clearly without being blended with the surrounding image.

Conversely, when the output of the hue comparison circuit 13 is large, the setting described above causes the hue control circuit 14 to decrease the hue control amount and does not almost change the hue of the OSD signal. In this case, because the hue of the original display image is different largely from the hue of the original OSD signal generated by the OSD generation circuit 11 and the OSD display is clear from the beginning, the hue control amount of the OSD signal may be small.

The matrix circuit 15 receives the brightness signal (Y1) of the OSD signal from the OSD generation circuit 11 and the color difference signals (Cb1', Cr1') of the OSD signal from the hue control circuit 14, and outputs primary color signals (R1, G1, B1) of the OSD display.

The blanking/half-tone circuit 9 receives primary color signals (R, G, B) from matrix circuit 8 and the OSD superimposed area signal from the OSD generation circuit 11, and outputs either primary signals (R', G', B'), from which the image of the OSD display part is deleted (blanking), or primary signals (R', G', B') whose amplitude of the image in the OSD display part is reduced (half tone) in order to display the OSD display clearly.

The OSD addition circuit 10 receives the primary signals (R', G', B') of the display image, whose OSD display part from the blanking/half-tone circuit 9 is blanked or half-toned, and the primary color signals (R1, G1, B1) of the OSD display from the matrix circuit 15, adds up the primary signals (R', G', B') of the display image and the primary color signals (R1, G1, B1) of the OSD display, and outputs the addition result to the display device as primary signals (R", G", B") of the display image to which the OSD is added.

In the first embodiment, the brightness signal (Y) and the color difference signals (Cb, Cr) of a display image are processed as described above. That is, the matrix circuit 8 converts the brightness signal (Y) and the color difference signals (Cb, Cr) to the primary color signals (R, G, B) of primary colors RGB, the blanking/half-tone circuit 9 masks the part corresponding to the OSD superimposed part (part hidden by the OSD), and the OSD addition circuit 10 adds the primary color signals (R1, G1, B1) of the OSD display, whose hue is controlled by the hue control circuit 14 to the masked display image, and outputs the display image, to which the OSD is added, to the display device. The hue control circuit 14, which controls the hue based on the information corresponding to the difference between the color difference signals (Cb', Cr') of the image in the OSD surrounding area in the display image and the color difference signals (Cb1, Cr1) of the OSD signal, can control the hue of the OSD display based on the hue of the surrounding area of the OSD display in the display screen. Therefore, this configuration prevents the OSD display from being blended with the background in the OSD surrounding area and provides a clear-to-view OSD display.

<Actual Example of Display Screen>

Figure 2:
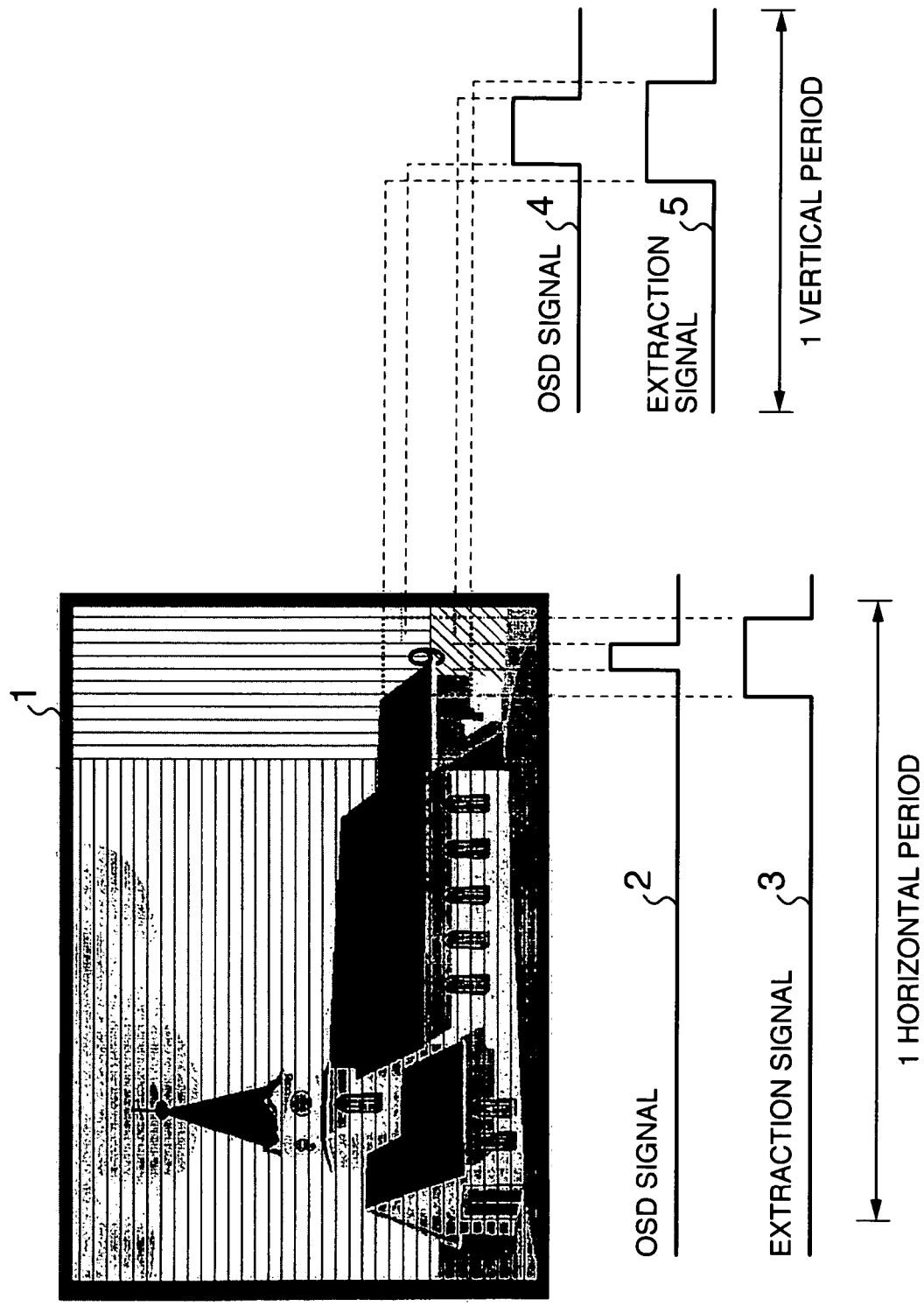
FIG. 2 is a diagram showing an actual example of an OSD display on the display screen of the OSD display apparatus in the first embodiment of the present invention.

Next, with reference to FIG. 2 and FIG. 3, the following describes an actual example of how the OSD display apparatus in the first embodiment of the present invention displays an OSD display on the display screen. FIG. 2 is a diagram showing an actual example of an OSD image displayed on the display screen by the OSD display apparatus in the first embodiment of the present invention. FIG. 3 is a close-up of the OSD surrounding area displayed on the display screen by the OSD display apparatus in the first embodiment of the present invention.

FIG. 2 shows a display screen 1 displayed by the OSD display apparatus. The image on the whole screen is composed mainly of a red hue (horizontal line part in FIG. 2) while the surrounding part of an OSD display ("9" is displayed in this example) is composed mainly of a green hue (slanted line part in FIG. 2) and a blue hue (vertical line part in FIG. 2).

An OSD image is displayed, for example, based on an OSD signal (horizontal period) 2 and an OSD signal (vertical period) 4.

An OSD surrounding area signal for extracting the OSD display surrounding part is composed, for example, of an extraction signal (horizontal period) 3 and an extraction signal (vertical period) 5. The extraction signals, which are set based on the OSD signal to extract the surrounding part of the OSD display, specify a range larger than the OSD display.

The image indicated by the numeral 6 in FIG. 3 shows an example in which the display color of the OSD display "9" is a green hue by default (slanted line part in the OSD display in FIG. 3). In this state, because the hue of the OSD display is similar to the hue of the surrounding image of a green hue (slanted line part in FIG. 3) and a blue hue (vertical line part in FIG. 3) in the surrounding part, the OSD display is blended with the surrounding image and is difficult to identify.

On the other hand, the image indicated by the numeral 7 in FIG. 3 shows an example in which the hue control circuit 14 controls the hue of the OSD display to clearly display it. That is, the display color of the OSD display "9" is changed to a red hue (horizontal line part in OSD display in FIG. 3) under hue control. In this state, the hue of the OSD display is different from the hue of the surrounding part where the hue is a green hue (slanted line part in FIG. 3) and a blue hue (vertical line part in FIG. 3). Therefore, the OSD display is not blended with the surrounding image but is displayed clearly.

In the example shown in FIG. 2, though the whole screen of the display image 1 contains many red components, the surrounding area of the OSD display contains many blue components and green components. In such an image, pulse signals such as the extraction signals 3 and 5, which are wider than the OSD display part in the horizontal and vertical directions, are generated in response to the OSD signals 2 and 4 from the OSD generation circuit 11. Those extraction signals 3 and 5 are used to extract the image of the OSD surrounding part from the original display image to obtain the image of the OSD surrounding part (the image of the background part of the OSD display in FIG. 3).

The OSD display apparatus in this embodiment detects the average hue from the image in the OSD surrounding part to give the hue information only on the OSD surrounding part. Because there are many green and blue hues in the OSD surrounding part in the example shown in FIG. 2, the hue information on the average hue also includes green and blue hues. The OSD display apparatus compares this hue information with the hue of the original OSD signal and, according to the comparison result, changes the hue of the OSD signal as necessary (from a green hue to a red hue in the example shown in FIG. 3). Therefore, the OSD display apparatus in this embodiment prevents the OSD display from being blended with the surrounding image irrespective of what the display image is and displays the OSD display clearly as indicated by the numeral 7 in FIG. 3 (Of course, it is also possible to intentionally blend the OSD display with the surrounding image if required).

A second embodiment is different from the first embodiment in that not only the hue but also the brightness of the OSD signal is controlled.

<Configuration of OSD Display Apparatus>

Figure 4:
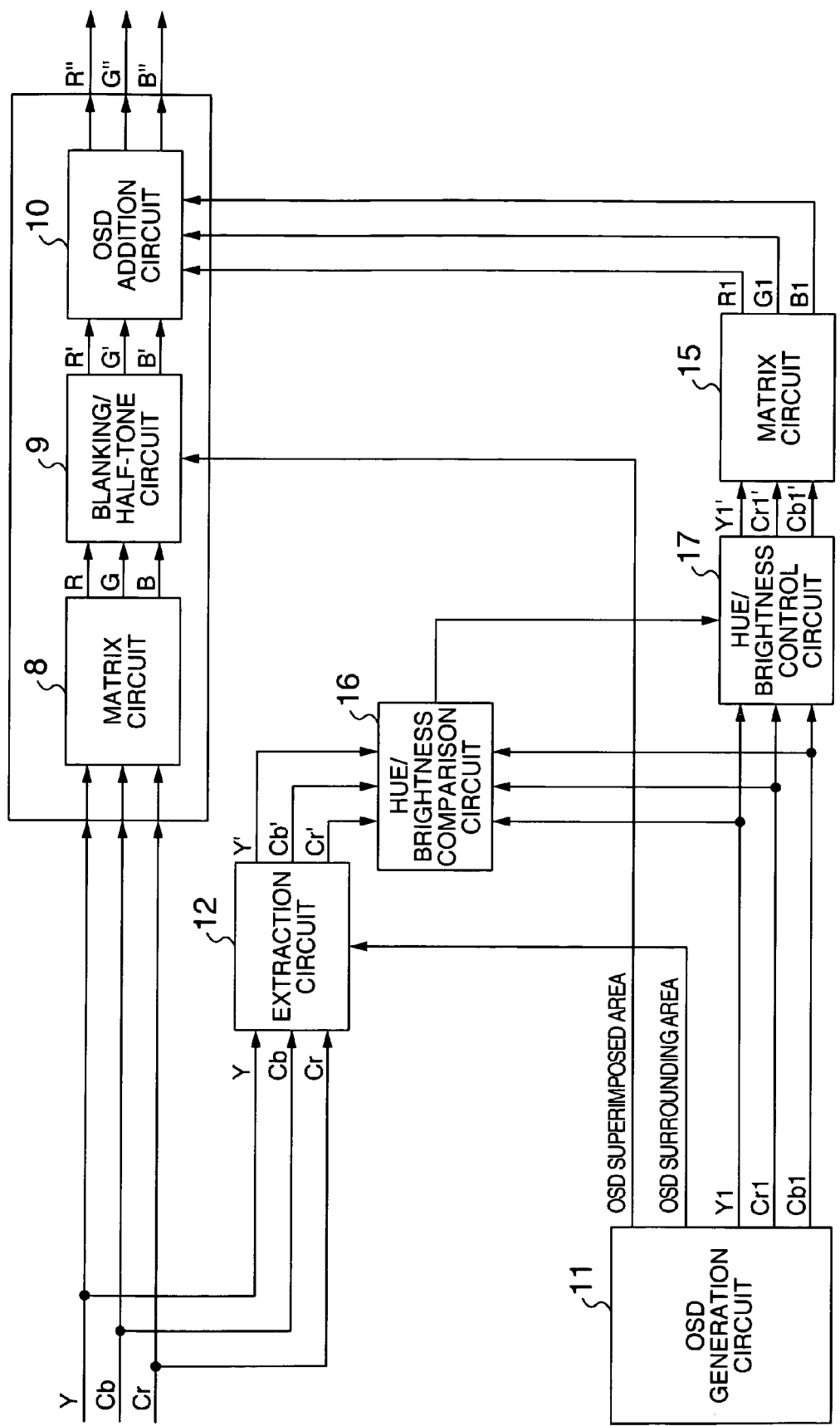
FIG. 4 is a diagram showing the configuration of an OSD display apparatus in a second embodiment of the present invention.

With reference to FIG. 4, the configuration of an OSD display apparatus in the second embodiment of the present invention will be described. FIG. 4 is a diagram showing the configuration of the OSD display apparatus in the second embodiment of the present invention.

Referring to FIG. 4, the OSD display apparatus comprises a matrix circuit 8, a blanking/half-tone circuit 9, an OSD addition circuit 10, an OSD generation circuit 11, an extraction circuit 12, a hue/brightness comparison circuit 16, a hue/brightness control circuit 17, and a matrix circuit 15.

The configuration is similar to that of the first embodiment except that the extraction circuit 12, the hue/brightness comparison circuit 16, and the hue/brightness control circuit 17 are different. The operation is also similar to that of the first embodiment except those for the circuits described above.

The extraction circuit 12 receives the brightness signal (Y) and the color difference signals (Cb, Cr) of a display image, extracts the OSD surrounding area of the OSD display in the display image based on the OSD surrounding area signal from the OSD generation circuit 11, and outputs the brightness signal (Y') and the color difference signals (Cb', Cr') of only the image in the extracted surrounding area of the OSD display. The image is extracted, for example, by passing the signals only when the extraction signal, which is the OSD surrounding area signal, is high.

The hue/brightness comparison circuit 16 receives the brightness signal (Y') and the color difference signals (Cb', Cr') from the extraction circuit 12 and the brightness signal (Y1) and the color difference signals (Cb1, Cr1) from the OSD generation circuit 11, and outputs information corresponding to the difference between the brightness signal (Y') and the brightness signal (Y1) and information corresponding to the difference between the color difference signals (Cb', Cr') and the color difference signals (Cb1, Cr1). The signals corresponding to those differences are output as the difference between the average of the brightness signals (Y') of the image of the OSD surrounding area extracted by the extraction circuit 12 and the brightness signal (Y1) of the OSD display image output from the OSD generation circuit 11 and as the difference between the average of the color difference signals (Cb', Cr') of the image of the OSD surrounding area extracted by the extraction circuit 12 and the color difference signals (Cb1, Cr1) of the OSD display image output from the OSD generation circuit 11.

The hue/brightness control circuit 17 receives the brightness signal (Y1) and the color difference signals (Cb1, Cr1) of the OSD signal from the OSD generation circuit 11, changes the hue and the brightness of the received OSD signal according to the information corresponding to the difference output by the hue/brightness comparison circuit 16, and outputs brightness signal (Y1') whose brightness has been changed and color difference signals (Cb1', Cr1') whose hue has been changed.

For example, the hue control amount of the hue/brightness control circuit 17 is set in inverse proportion to the value of information output from the hue/brightness comparison circuit 16, and the brightness control amount is set in proportion to the value of information output from the hue/brightness comparison circuit 16 so that the brightness of the OSD signal becomes almost equal to the brightness of the OSD surrounding part. This setting causes the hue/brightness control circuit 17 to increase the hue control amount and to decrease the brightness control amount when the output of the hue/brightness comparison circuit 16 is small (that is, the hue/brightness of the OSD surrounding part in the display image is close to the hue/brightness of the OSD signal). This configuration makes the hue of the OSD signal, which is output from the hue/brightness control circuit 17, different largely from the hue of the OSD surrounding part in the display image, and makes the brightness of the OSD signal output from the hue/brightness control circuit 17 almost equal to the brightness of the OSD surrounding part of the display image. Therefore, this configuration prevents the OSD display from being blended with the surrounding image, displays the OSD display clearly, and makes the brightness of the OSD display almost equal to the brightness of the OSD surrounding part of the display image, thus providing an easy-to-view OSD display.

Conversely, when the output of the hue/brightness comparison circuit 16 is large, the setting described above causes the hue/brightness control circuit 17 to decrease the hue control amount and to increase the brightness control amount so that the brightness of the OSD signal becomes almost equal to the brightness of the OSD surrounding part of the display image. The hue of the OSD signal is not almost changed. In this case, because the hue of the original display image is different largely from the hue of the original OSD signal generated by the OSD generation circuit 11 and therefore the OSD display is clear from the beginning, the hue control amount of the OSD signal may be small. Because the brightness of the OSD signal is increased so that the brightness of the OSD signal becomes almost equal to the brightness of the OSD surrounding part of the display image, the brightness of the OSD signal becomes almost equal to the brightness of the OSD surrounding part of the display image to make the OSD display easy to view.

In the second embodiment, the brightness signal of a display image is received by the extraction circuit 12 in the same manner as the color difference signals in the first embodiment, the hue/brightness comparison circuit 16 is provided instead of the hue comparison circuit 13 in the first embodiment, and the hue/brightness control circuit 17 is provided instead of the hue control circuit 14 in the first embodiment as described above.

The hue/brightness comparison circuit 16 receives the brightness signal and the color difference signals output from the extraction circuit 12 and the brightness signal and the color difference signals of the OSD signal, compares them, and outputs information corresponding to the difference. The hue/brightness control circuit 17 receives the brightness signal and the color difference signals of the OSD signal and controls the brightness and the hue of the OSD signal according to the information output from the hue/brightness comparison circuit 16. The OSD display apparatus in this embodiment controls the hue as well as the brightness to increase the brightness of the OSD to make it brighter when the display image is bright, and decreases the brightness of the OSD to make it darker when the display image is dark. In this way, the OSD display apparatus makes constant the relative contrast of the OSD display, providing a quite but easy-to-view OSD display.

A third embodiment is different from the first embodiment and the second embodiment in that, when a display image is detected, a part of the image to be hidden by an OSD is masked (excluded) in advance to prevent the hue (and brightness) of this part from being detected.

<Configuration of OSD Display Apparatus>

Figure 5:
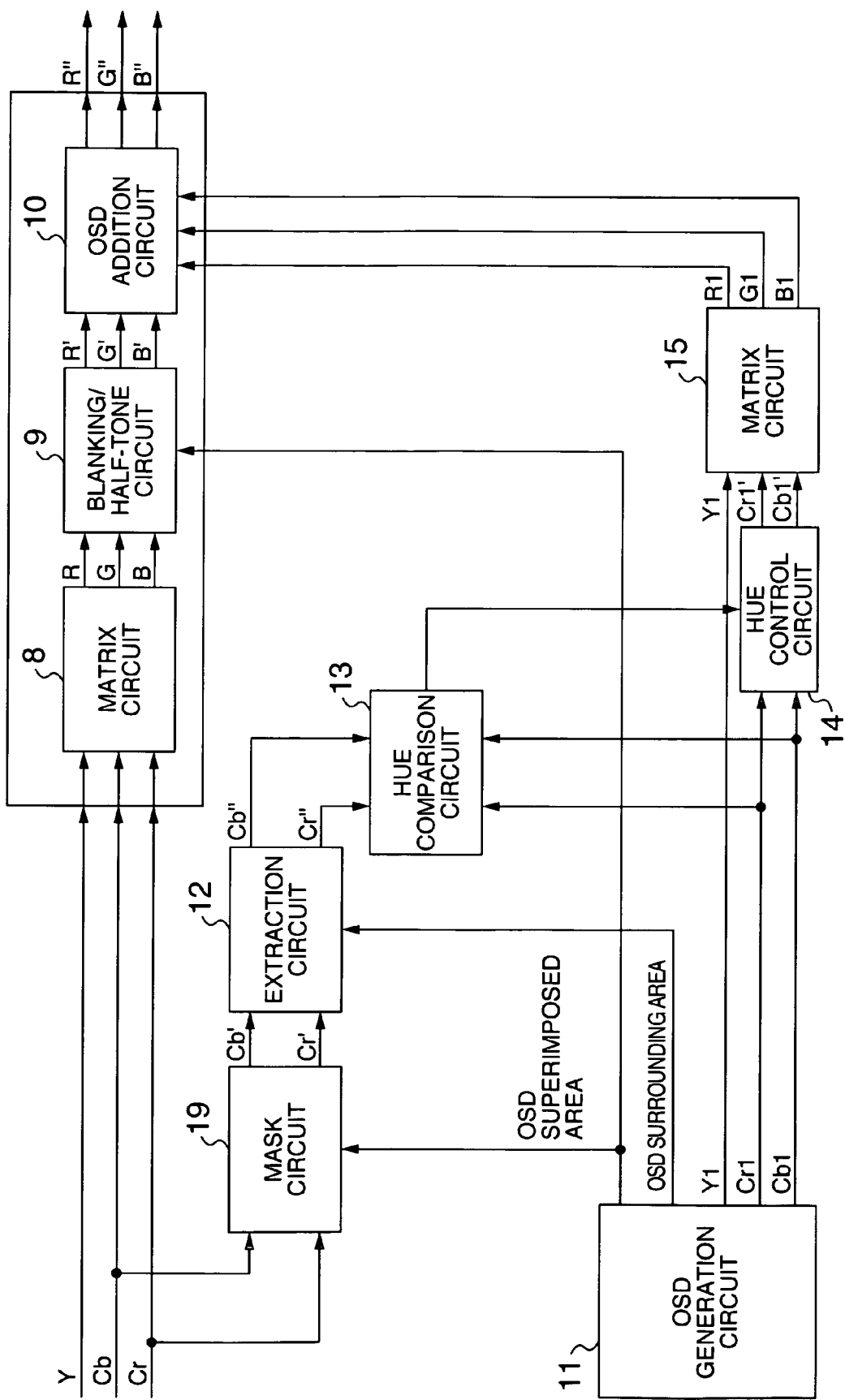
FIG. 5 is a diagram showing an example of the configuration of an OSD display apparatus in a third embodiment of the present invention.
Figure 6:
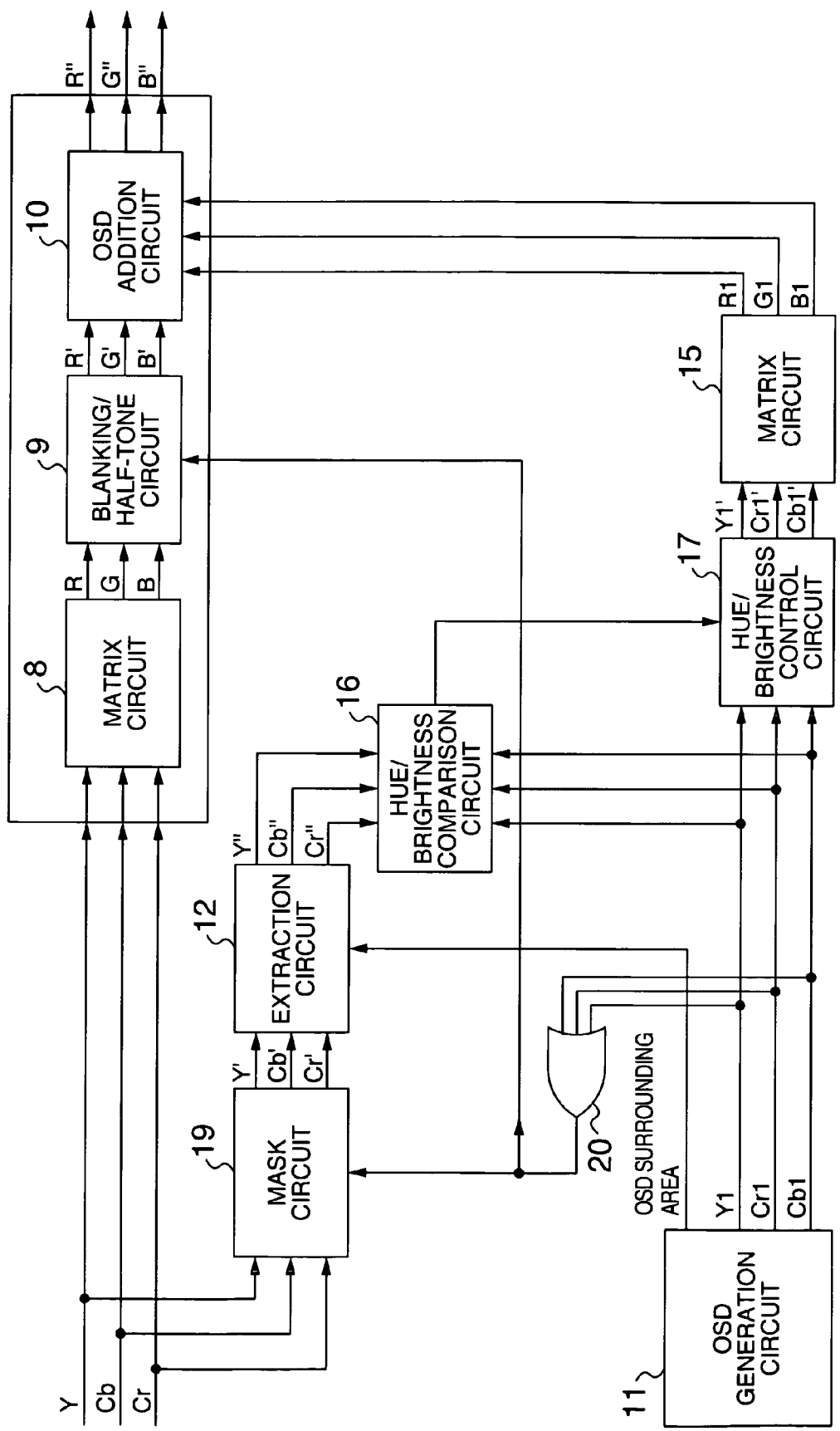
FIG. 6 is a diagram showing another example of the configuration of an OSD display apparatus in the third embodiment of the present invention.
Figure 7:
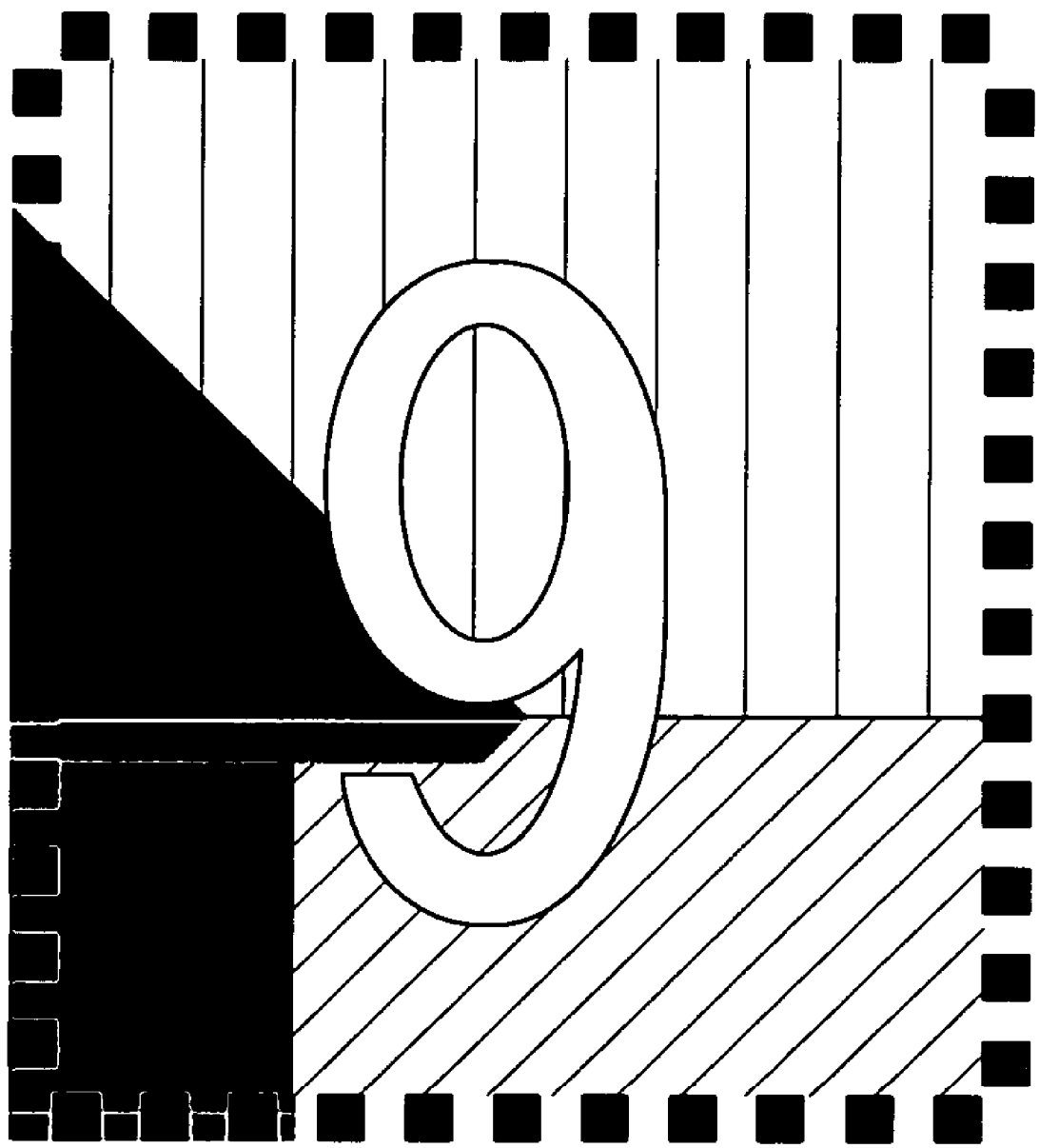
FIG. 7 is a diagram showing the mask processing of the OSD display apparatus in the third embodiment of the present invention.

With reference to FIG. 5 to FIG. 7, the configuration of an OSD display apparatus in the third embodiment of the present invention will be described. FIG. 5 is a diagram showing an example of the configuration of the OSD display apparatus in the third embodiment of the present invention, FIG. 6 is a diagram showing another example of the configuration of the OSD display apparatus in the third embodiment of the present invention, and FIG. 7 is a diagram showing the mask processing of the OSD display apparatus in the third embodiment of the present invention.

Referring to FIG. 5, the OSD display apparatus comprises a matrix circuit 8, a blanking/half-tone circuit 9, an OSD addition circuit 10, an OSD generation circuit 11, an extraction circuit 12, a hue comparison circuit 13, a hue control circuit 14, and a matrix circuit 15, and a mask circuit 19.

The configuration is similar to that of the first embodiment except that the mask circuit 19 is added. The operation is also similar to that of the first embodiment except that the extraction circuit 12 receives the color difference signals (Cb', Cr') from the mask circuit 19 that receives the color difference signals (Cb, Cr) of a display image.

The mask circuit 19 receives the color difference signals (Cb, Cr) of a display image and the OSD superimposed area signal output by the OSD generation circuit 11 used for blanking/half-toning the display image and outputs the color difference signals (Cb', Cr') generated by masking the OSD superimposed area part from the display image. The part masked by the mask circuit 19, which has no color difference information, is excluded from the difference calculation of the color difference signals carried out in the hue comparison circuit 13. The image of the OSD superimposed area is masked, for example, by preventing the signals from passing when the OSD superimposed area signal is high.

The color difference signals (Cb', Cr') output from the mask circuit 19 are input to the extraction circuit 12. The image of color difference signals (Cb", Cr") output from the extraction circuit 12 is an image generated by excluding the OSD display itself (white part in FIG. 7) from the image of the OSD surrounding part as shown in FIG. 7.

Referring to FIG. 6, the OSD display apparatus comprises a matrix circuit 8, a blanking/half-tone circuit 9, an OSD addition circuit 10, an OSD generation circuit 11, an extraction circuit 12, a hue comparison circuit 13, a hue control circuit 14, a matrix circuit 15, a mask circuit 19, and an OR circuit 20.

This configuration is similar to that of the first embodiment except for the OSD generation circuit 11, the mask circuit 19 and the OR circuit 20. The operation is also similar to that of the first embodiment except that the brightness signal (Y') and the color difference signals (Cb', Cr') output from the mask circuit 19 are input to the extraction circuit 12, the brightness signal (Y1) and the color difference signals (Cb1, Cr1) output from the OSD generation circuit 11, instead of the OSD superimposed signal output from the OSD generation circuit 11, are input to the OR circuit 20, and the output signal of the OR circuit 20 is used.

In the example shown in FIG. 6, the OSD generation circuit 11 does not output the OSD superimposed area signal but outputs the OSD surrounding area signal as well as the brightness signal (Y1) and the color difference signals (Cb1, Cr1) of the OSD signal. Instead of the OSD superimposed area signal, the output signal of the OR circuit 20 that receives the brightness signal (Y1) and the color difference signals (Cb1, Cr1) of the OSD signal is used. When at least one of the brightness signal and the color difference signals of the OSD signal is not 0, there is always an OSD display. Therefore, by sending the OSD signal to the OR circuit 20, the mask signal can be obtained as the OSD superimposed area signal.

The mask circuit 19 receives the brightness signal (Y) and the color difference signals (Cb, Cr) of the display image and the output signal of the OR circuit 20, and outputs the color difference signals (Cb', Cr') generated by masking the part of the OSD superimposed area part from the display image. The part masked by the mask circuit 19, which has no information on the brightness signal and the color difference signal, is excluded from the difference calculation of the brightness signal and the color difference signal carried out in the hue/brightness comparison circuit 16. The image of the OSD superimposed area is masked, for example, by preventing the signals from passing when the output signal of the OR circuit 20 is high.

Because the information on the part of a display image hidden by an OSD display is invisible when displayed on a display device, the OSD display apparatus in the third embodiment excludes the information on this part of the display image in advance as described above to increase detection precision.

In particular, because display image information is detected only in the OSD surrounding part, the OSD area (white part in FIG. 7) occupies a large area in the image information detection range as shown in FIG. 7. Therefore, excluding the part of the display image to be hidden by the OSD display greatly increases the precision of image information detection. This helps to better control the hue and brightness of the OSD signal.

As the example of the third embodiment, the configuration in which the mask circuit 19 is added to the configuration of the first embodiment shown in FIG. 1 and the configuration in which the mask circuit 19 and the OR circuit 20 are added to the configuration of the second embodiment shown in FIG. 4 are shown. It is also possible to use a configuration in which the mask circuit 19 and the OR circuit 20 are added to the configuration in the first embodiment shown in FIG. 1 and a configuration in which the mask circuit 19 is added to the configuration in the second embodiment shown in FIG. 4.

In a fourth embodiment, the OSD generation circuit 11 outputs a mask signal for masking, instead of the OSD superimposed area signal, to the mask circuit 19 in the configuration in the third embodiment shown in FIG. 5, and the mask circuit 19 receives that mask signal.

<Configuration of OSD Display Apparatus>

Figure 8:
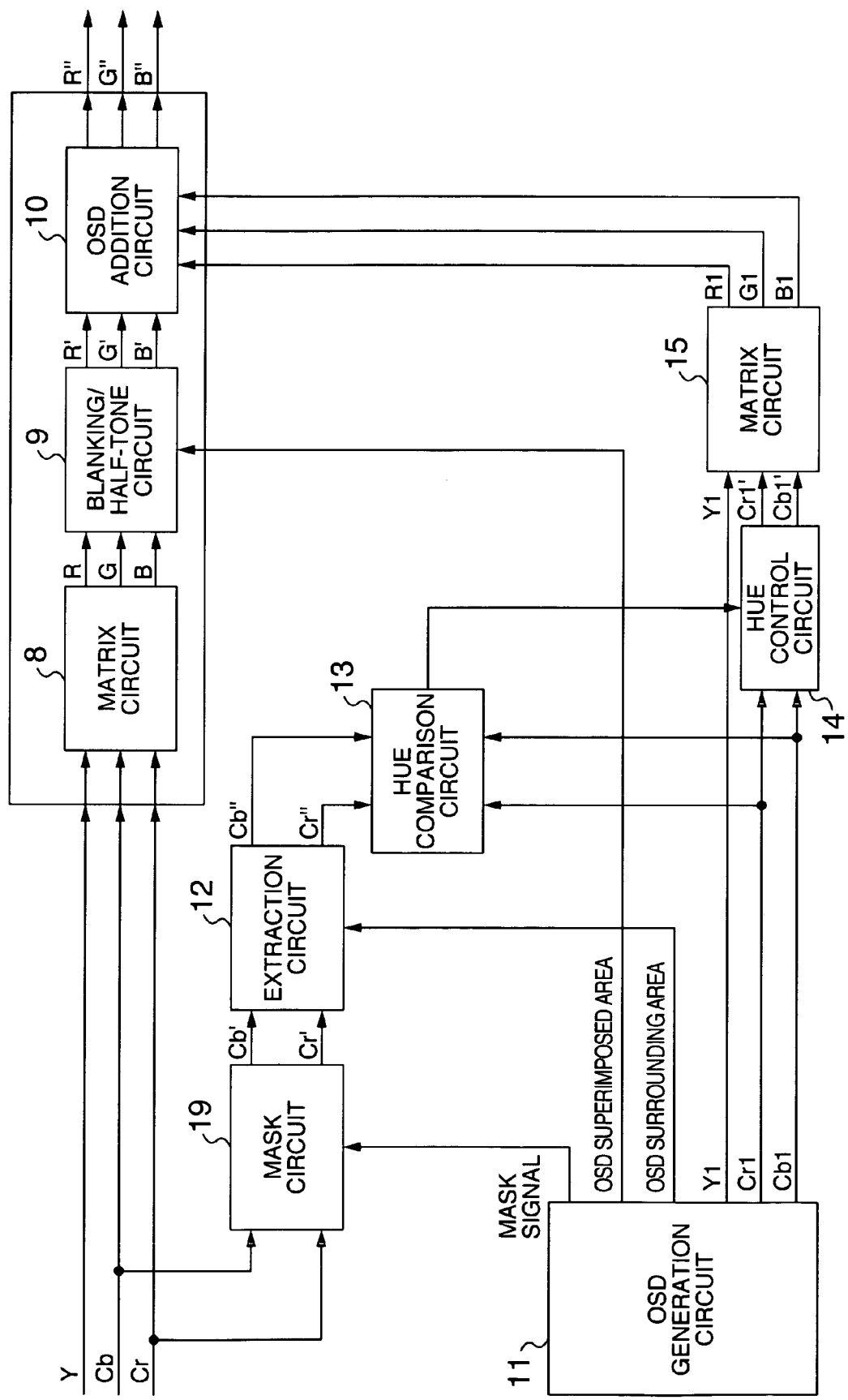
FIG. 8 is a diagram showing the configuration of an OSD display apparatus in a fourth embodiment of the present invention.
Figure 9:
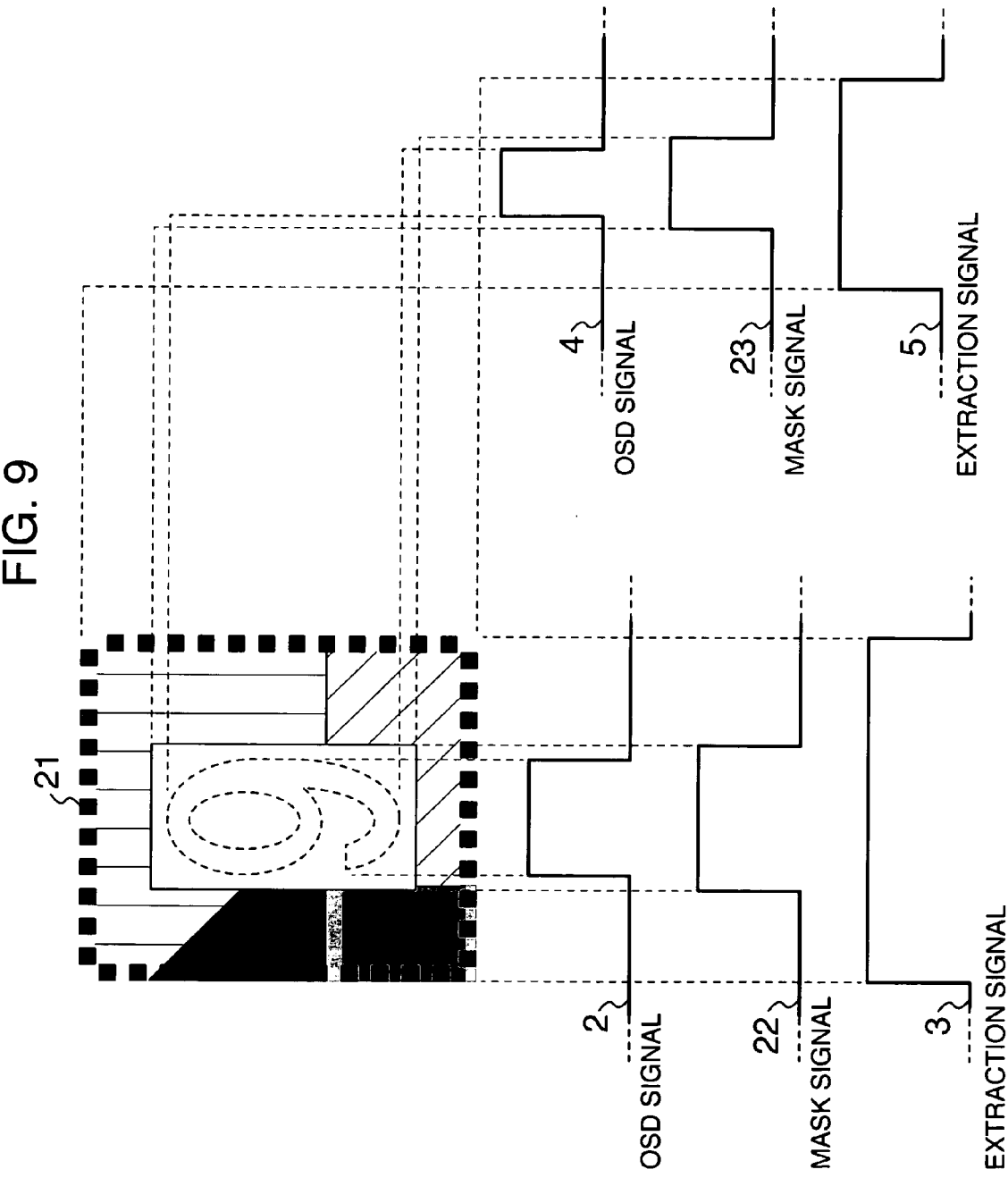
FIG. 9 is a diagram showing an extracted image on the OSD display apparatus in the fourth embodiment of the present invention.

With reference to FIG. 8 and FIG. 9, the configuration of an OSD display apparatus in the fourth embodiment of the present invention will be described. FIG. 8 is a diagram showing the configuration of the OSD display apparatus in the fourth embodiment of the present invention, and FIG. 9 is a diagram showing an image extracted by the OSD display apparatus in the fourth embodiment of the present invention.

Referring to FIG. 8, the OSD display apparatus comprises a matrix circuit 8, a blanking/half-tone circuit 9, an OSD addition circuit 10, an OSD generation circuit 11, an extraction circuit 12, a hue comparison circuit 13, a hue control circuit 14, a matrix circuit 15, and a mask circuit 19.

The configuration is similar to that of the third embodiment shown in FIG. 5 except that the mask signal for masking is output from the OSD generation circuit 11 and that the mask signal is input to the mask circuit 19. The operation is also similar to that of the third embodiment shown in FIG. 5 except that the mask circuit 19 uses the color difference signals (Cb, Cr) of a display image and the mask signal to output the color difference signals (Cb', Cr') generated by masking the part, specified by the mask signal, from the display image.

The OSD generation circuit 11 generates the OSD signals as well as the mask signals. The generated mask signals are generated as a mask signal (horizontal period) 22 and a mask signal (vertical period) 23 for an OSD signal (horizontal period) 2, an OSD signal (vertical period) 4, an extraction signal (horizontal period) 3, and an extraction signal (vertical period) 5, as shown in FIG. 9. In the example shown in FIG. 9, the rectangular area (white part in FIG. 9) that contains the area where the OSD is displayed is the mask area.

The color difference signals (Cb', Cr') output from this mask circuit 19 are input to the extraction circuit 12. The image of the color difference signals (Cb", Cr") output from the extraction circuit 12 is the image generated by excluding the rectangular area (white part in FIG. 9), which contains the part where the OSD is displayed, from the image of the OSD surrounding part as shown by the numeral 21 in FIG. 9.

Because information on a part hidden by an OSD display and its surrounding display image are invisible or difficult to view when displayed on the display device, the OSD display apparatus in the fourth embodiment excludes the information on this part of the display image in advance as described above to increase detection precision.

In a fifth embodiment, the processing of the hue control circuit 14 is performed in the OSD generation circuit 11 in the configuration of the third embodiment shown in FIG. 5.

<Configuration of OSD Display Apparatus>

Figure 10:
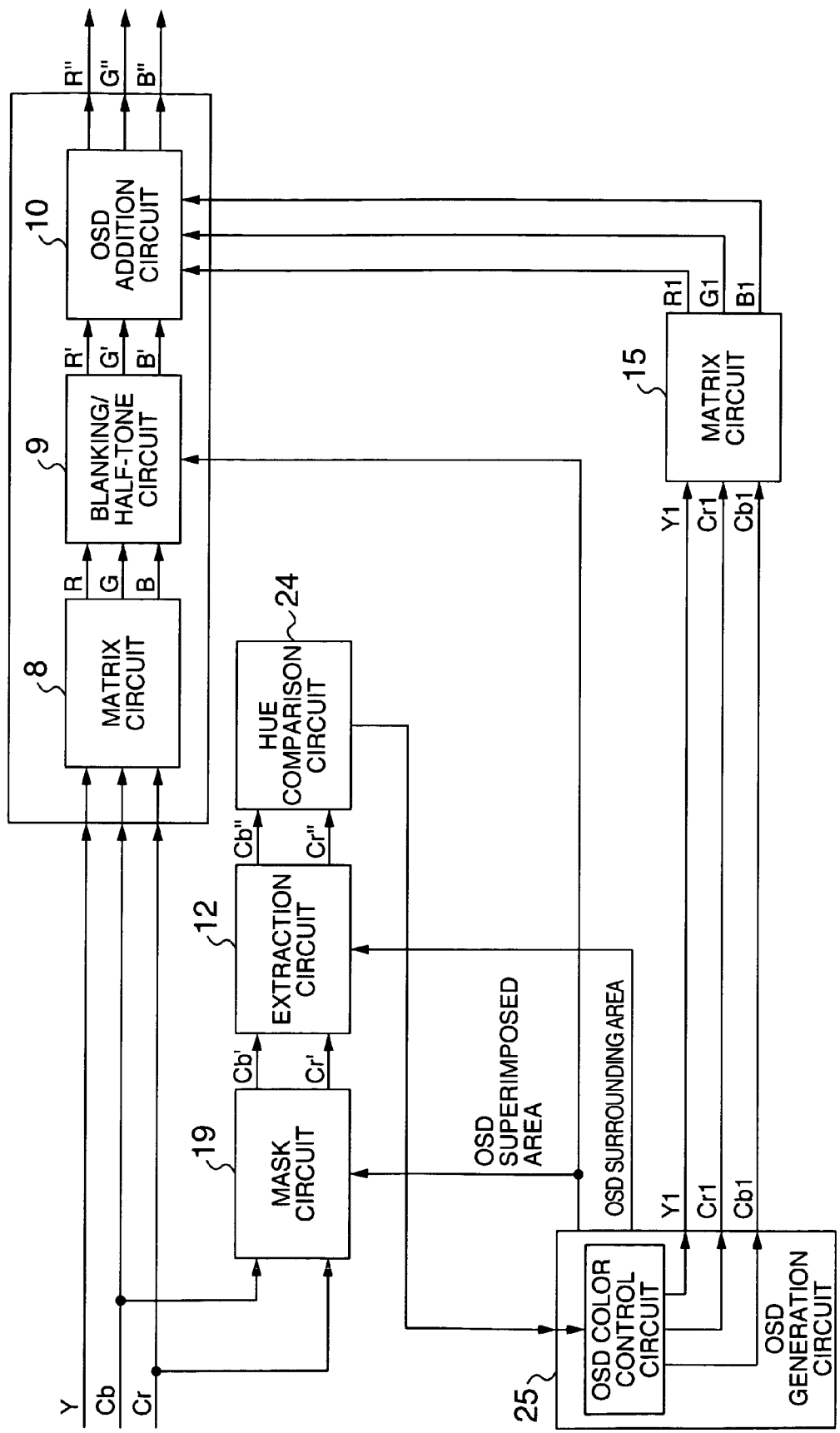
FIG. 10 is a diagram showing the configuration of an OSD display apparatus in a fifth embodiment of the present invention.

Referring to FIG. 10, the configuration of an OSD display apparatus in the fifth embodiment of the present invention will be described. FIG. 10 is a diagram showing the configuration of the OSD display apparatus in the firth embodiment of the present invention.

Referring to FIG. 10, the OSD display apparatus comprises a matrix circuit 8, a blanking/half-tone circuit 9, an OSD addition circuit 10, an OSD generation circuit 25, an extraction circuit 12, a hue detection circuit 24, a matrix circuit 15, and a mask circuit 19.

The configuration is similar to that of the third embodiment shown in FIG. 5 except that the color difference signals (Cb", Cr") output from the extraction circuit 12 are input to the hue detection circuit 24 and that the hue information signal output from the hue detection circuit 24 is input to the OSD generation circuit 25. The operation is also similar to that of the configuration of the third embodiment shown in FIG. 5 except that the OSD generation circuit 25 uses an internal OSD color control circuit to control the hue of the OSD display based on the hue information from the hue detection circuit 24 and outputs the brightness signal (Y1) and the color difference signals (Cb1, Cr1) of the OSD signal.

The OSD generation circuit 25 has the OSD color control circuit internally to set the OSD color freely. The OSD generation circuit 25 receives the hue information on the OSD surrounding part output from the hue detection circuit 24 and, based on the hue information on the OSD surrounding area, sets the hue of the OSD signal, and outputs the brightness signal (Y1) and the color difference signals (Cb1, Cr1) as the OSD signal.

The hue detection circuit 24 receives information on the color difference signals (Cb", Cr") of the OSD surrounding part output from the extraction circuit 12 and, based on this information, outputs hue information on the OSD surrounding part. The output hue information is, for example, information on the average value of the color difference signals (Cb', Cr') of the image of the OSD surrounding area extracted by the extraction circuit 12.

The hue information output from this hue detection circuit 24 is input to the OSD generation circuit 25 that can internally set the OSD color freely. Therefore, controlling the OSD color according to the hue information output from the hue detection circuit 24, for example, specifying that an OSD whose hue is generated by reversing the hue information from the hue detection circuit 24 be output, causes the OSD display apparatus to display an OSD a hue always opposite to the hue of the surrounding image, thereby displaying the OSD clearly without being blended with any display image.

As in the hue control operation of the hue control circuit 14 in the first embodiment, it is also possible to set a hue in the OSD generation circuit 25 in such a way that the difference between the hue information of the standard OSD color and the hue information output from the hue detection circuit 24 is calculated and the hue control amount is set in inverse proportion to the value of the calculated difference information.

Because the OSD color is controlled in the OSD generation circuit 25, the OSD display apparatus in the fifth embodiment can set the hue of the OSD signal, output from the OSD generation circuit 25, to a hue with which the OSD is displayed clearly without being blended with the surrounding image.

In the example in the fifth embodiment, the processing of the hue control circuit 14 in the configuration of the third embodiment shown in FIG. 5 is performed in the OSD generation circuit 11. It is also possible to provide the hue detection circuit 24 or a hue/brightness detection circuit in the first, second, or fourth embodiment to control the OSD color in the OSD generation circuit 25.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A display apparatus that displays OSD (On-Screen Display) information in a part of a screen on which video information is displayed, said display apparatus comprising:
   an OSD generation circuit that generates an OSD signal for displaying the OSD information;
   an OSD signal control circuit that changes the OSD signal according to video information displayed in a surrounding area of the OSD display;
   an OSD signal addition circuit that adds an OSD signal, which is converted by said OSD signal control circuit, to a video signal displayed on said display apparatus; and
   a blanking circuit that masks the video signal using an OSD superimposed area signal that is output by said OSD generation circuit to indicate a display effective period of the OSD information;
   wherein said OSD signal addition circuit adds up the video signal masked by the OSD superimposed area signal and the OSD signal converted by said OSD signal control circuit.

2. A display apparatus that displays OSD (On-Screen Display) information in a part of a screen on which video information is displayed, said display apparatus comprising:
   an OSD generation circuit that generates an OSD signal for displaying the OSD information;
   an OSD signal control circuit that changes the OSD signal according to video information displayed in a surrounding area of the OSD display;
   an OSD signal addition circuit that adds an OSD signal, which is converted by said OSD signal control circuit, to a video signal displayed on said display apparatus; and
   a half-tone circuit that decreases an amplitude level of the video signal using an OSD superimposed area signal that is output by said OSD generation circuit to indicate a display effective period of the OSD information;
   wherein said OSD signal addition circuit adds up the video signal whose amplitude level is decreased by the OSD superimposed area signal and the OSD signal converted by said OSD signal control circuit.

3. A display apparatus that displays OSD (On-Screen Display) information in a part of a screen on which video information is displayed, said display apparatus comprising:
   an OSD generation circuit that generates an OSD signal for displaying the OSD information;
   an OSD signal control circuit that changes the OSD signal according to video information displayed in a surrounding area of the OSD display;
   an OSD signal addition circuit that adds an OSD signal, which is converted by said OSD signal control circuit, to a video signal displayed on said display apparatus;
   an extraction circuit that extracts a video signal of an OSD surrounding area from the video signal using an OSD surrounding area signal that is output by said OSD generation circuit to indicate a display area of the OSD information; and
   a video signal comparison circuit that compares the OSD signal with the video signal extracted by said extraction circuit;
   wherein said OSD signal control circuit changes the OSD signal according to an output from said video signal comparison circuit.

4. The display apparatus according to claim 3,
   wherein the OSD signal and the video signal each comprise a brightness signal and color difference signals,
   said extraction circuit extracts color difference signals of the OSD surrounding area from the video signal, and
   said video signal comparison circuit compares the color difference signals of the OSD signal with the color difference signals of the extracted video signal.

5. The display apparatus according to claim 4,
   wherein said video signal comparison circuit compares an average value of the color difference signals of the video signal of the OSD surrounding area extracted by said extraction circuit with the color difference signals of the OSD signal and
   said OSD signal control circuit converts the color difference signals of the OSD signal so that a hue becomes different between the extracted video signal and the OSD signal, based on difference information output by said video signal comparison circuit.

6. The display apparatus according to claim 3,
   wherein the OSD signal and the video signal each comprise a brightness signal and color difference signals,
   said extraction circuit extracts the brightness signal and the color difference signals of the OSD surrounding area from the video signal, and
   said video signal comparison circuit compares the brightness signal and the color difference signals of the OSD signal with the brightness signal and the color difference signals of the extracted video signal.

7. The display apparatus according to claim 6, wherein said video signal comparison circuit compares an average value of the color difference signals of the video signal of the OSD surrounding area extracted by said extraction circuit with the color difference signals of the OSD signal and compares the brightness signal of the video signal of the OSD surrounding area extracted by said extraction circuit with the brightness signal of the OSD signal, and said OSD signal control circuit converts the color difference signals of the OSD signal so that a hue becomes different, and converts the brightness signal of the OSD signal so that the brightness becomes equal, between the extracted video signal and the OSD signal based on difference information output by said video signal comparison circuit.

8. A display apparatus that displays OSD (On-Screen Display) information in a part of a screen on which video information is displayed, said display apparatus comprising:

an OSD generation circuit that generates an OSD signal for displaying the OSD information;

an OSD signal control circuit that changes the OSD signal according to video information displayed in a surrounding area of the OSD display;

an OSD signal addition circuit that adds an OSD signal, which is converted by said OSD signal control circuit, to a video signal displayed on said display apparatus;

a blanking/half-tone circuit that masks or decreases an amplitude level of the video signal using an OSD superimposed area signal that is output by said OSD generation circuit to indicate a display effective period of the OSD information;

a mask circuit that masks the video signal using the OSD superimposed area signal that is output by said OSD generation circuit to indicate a display effective period of the OSD information;

an extraction circuit that extracts a video signal of an OSD surrounding area from an output signal of said mask circuit using an OSD surrounding area signal that is output by said OSD generation circuit to indicate a display area of the OSD information; and a video signal comparison circuit that compares the OSD signal with the video signal extracted by said extraction circuit;

wherein said OSD signal addition circuit adds up the video signal, which is masked or whose amplitude level is decreased by the OSD superimposed area signal, and the OSD signal converted by said OSD signal control circuit.

9. The display apparatus according to claim 8 wherein the OSD signal and the video signal each comprise a brightness signal and color difference signals, said extraction circuit and said mask circuit control the color difference signals of the OSD surrounding area of the video signal, said video signal comparison circuit compares an average value of the color difference signals of the video signal of the OSD surrounding area extracted by said extraction circuit with the color difference signals of the OSD signal, and said OSD signal control circuit converts the color difference signals of the OSD signal so that a hue becomes different between the extracted video signal and the OSD signal, based on difference information output by said video signal comparison circuit.

10. The display apparatus according to claim 8 wherein the OSD signal and the video signal each comprise a brightness signal and color difference signals, said extraction circuit and said mask circuit control the brightness signal and the color difference signals of the OSD surrounding area of the video signal, said video signal comparison circuit compares an average value of the color difference signals of the video signal of the OSD surrounding area extracted by said extraction circuit with the color difference signals of the OSD signal and compares the brightness signal of the video signal of the OSD surrounding area extracted by said extraction circuit with the brightness signal of the OSD signal, and said OSD signal control circuit converts the color difference signals of the OSD signal so that a hue becomes different, and converts the brightness signal of the OSD signal so that the brightness becomes equal, between the extracted video signal and the OSD signal based on difference information output by said video signal comparison circuit.

11. The display apparatus according to claim 8, wherein the OSD signal and the video signal each comprise a brightness signal and color difference signals, and the OSD superimposed area signal that indicates a display effective period of the OSD information is generated by adding up the brightness signal and the color difference signals.

12. A display apparatus that displays OSD (On-Screen Display) information in a part of a screen on which video information is displayed, said display apparatus comprising:

an OSD generation circuit that generates an OSD signal for displaying the OSD information;

an OSD signal control circuit that changes the OSD signal according to video information displayed in a surrounding area of the OSD display;

an OSD signal addition circuit that adds an OSD signal, which is converted by said OSD signal control circuit, to video signal displayed on said display apparatus;

a blanking/half-tone circuit that masks or decreases an amplitude level of the video signal using an OSD superimposed area signal that is output by said OSD generation circuit to indicate a display effective period of the OSD information;

a mask circuit that masks the video signal using a mask signal that is output by said OSD generation circuit to indicate an OSD display frame area including a display effect period of the OSD information;

an extraction circuit that extracts a video signal of an OSD surrounding area from an output signal of said mask circuit using an OSD surrounding area signal that is output by said OSD generation circuit to indicate a display area of the OSD information; and a video signal comparison circuit that compares the OSD signal with the video signal extracted by said extraction circuit;

wherein said OSD signal addition circuit adds up the video signal, which is masked or whose amplitude level is decreased by the OSD superimposed area signal, and the OSD signal converted by said OSD signal control circuit.

13. The display apparatus according to claim 12 wherein the OSD signal and the video signal each comprise a brightness signal and color difference signals, said extraction circuit and said mask circuit control the color difference signals of the OSD surrounding area of the video signal, said video signal comparison circuit compares an average value of the color difference signals of the video signal of the OSD surrounding area extracted by said extraction circuit with the color difference signals of the OSD signal, and said OSD signal control circuit converts the color difference signals of the OSD signal so that a hue becomes different between the extracted video signal and the OSD signal, based on difference information output by said video signal comparison circuit.

14. The display apparatus according to claim 12
wherein the OSD signal and the video signal each comprise a brightness signal and color difference signals, said extraction circuit and said mask circuit control the brightness signal and the color difference signals of the OSD surrounding area of the video signal, said video signal comparison circuit compares an average value of the color difference signals of the video signal of the OSD surrounding area extracted by said extraction circuit with the color difference signals of the OSD signal and compares the brightness signal of the video signal of the OSD surrounding area extracted by said extraction circuit with the brightness signal of the OSD signal, and said OSD signal control circuit converts the color difference signals of the OSD signal so that a hue becomes different, and converts the brightness signal of the OSD signal so that the brightness becomes equal, between the extracted video signal and the OSD signal based on difference information output by said video signal comparison circuit.

15. A display apparatus that displays OSD information in a part of a screen on which video information is displayed, said display apparatus comprising:

an OSD generation circuit that generates an OSD signal for displaying the OSD information;

a blanking/half-tone circuit that masks or decreases an amplitude level of a video signal using an OSD superimposed area signal that is output by said OSD generation circuit to indicate a display effective period of the OSD information;

a mask circuit that masks the video signal using the OSD superimposed area signal that is output by said OSD generation circuit to indicate a display effective period of the OSD information;

an extraction circuit that extracts a video signal of the OSD surrounding area from an output signal of the mask circuit using an OSD surrounding area signal that is output by said OSD generation circuit to indicate a display area of the OSD information;

a video signal comparison circuit that compares the OSD signal with the video signal extracted by said extraction circuit; and an OSD signal addition circuit that adds up the video signal which is masked or whose amplitude level is decreased by the OSD superimposed area signal and the OSD signal converted by said OSD signal control circuit, wherein said OSD generation circuit generates the OSD signal based on difference information output by said video signal comparison circuit.

16. A method for controlling an OSD display on a display apparatus that displays OSD information in a part of a screen on which video information is displayed, said method comprising the steps of:

generating an OSD signal;

extracting a video signal of an OSD surrounding area from a video signal using an OSD surrounding area signal indicating a display area of the OSD information;

comparing the OSD signal with the video signal of the extracted OSD surrounding area;

converting the OSD signal based on the comparison result;

masking, or decreasing an amplitude level of, the video signal using an OSD superimposed area signal indicating a display effective period of the OSD information; and adding up the converted OSD signal and the video signal which is masked or whose amplitude level is decreased.

17. The method according to claim 16,
wherein the OSD signal and the video signal each comprise a brightness signal and color difference signals, said method further comprising the steps of:

comparing the color difference signals of the OSD signal with an average value of the color difference signals of the extracted video signal; and converting the color difference signals of the OSD signal so that a hue becomes different between the extracted video signal and the OSD signal based on the comparison result.

18. The method according to claim 16,
wherein the OSD signal and the video signal each comprise a brightness signal and color difference signals, said method further comprising the steps of:

comparing the color difference signals of the OSD signal with an average value of the color difference signals of the extracted video signal and comparing the brightness signal of the video signal of the extracted OSD surrounding area with the brightness signal of the OSD signal; and converting the color difference signals of the OSD signal so that a hue becomes different, and converting the brightness signal of the OSD signal so that the brightness becomes equal, between the extracted video signal and the OSD signal based on the comparison result.

19. The method according to claim 16, further comprising the step of extracting the video signal of the OSD surrounding area and the OSD signal from the video signal using the OSD surrounding area signal indicating a display area of the OSD information and the OSD superimposed area signal indicating a display effective period of the OSD information.

* * * * *